Nov. 20, 1951     J. W. MacCLATCHIE     2,576,025

PUMP PISTON

Filed Oct. 2, 1948

INVENTOR,
JOHN W. MacCLATCHIE
BY
Robert M. Mc Manigal
ATTORNEY

Patented Nov. 20, 1951

2,576,025

UNITED STATES PATENT OFFICE 2,576,025

PUMP PISTON

John W. MacClatchie, Los Angeles, Calif.

Application October 2, 1948, Serial No. 52,556

4 Claims. (Cl. 309—4)

This invention relates to pistons used in mud pumps and the like.

More particularly this invention relates to that type of piston in which annular packing elements of resilient material are mounted on an axial support with a flange projecting radially from the axial support which forms a backing for the packing elements, and of the type of piston shown in Letters Patent No. 2,443,110, granted to me on June 8, 1948.

In most conventional pistons the resilient portions of the packing elements are distorted as the packing elements are sealed off with respect to said radially projecting flange.

An object of my invention is to provide a piston in which packing elements mounted on an axial support are sealed off with respect to a flange projecting radially from said support without distorting the resilient portions of said packing elements.

Another object of my invention is to provide a piston in which packing elements mounted on an axial support are sealed off with respect to a flange projecting radially from said axial support by means threaded on said axial support without distorting the resilient portions of said packing elements by means threaded on the hub of the piston.

Another object of my invention is to provide an annular space between the packing elements beyond the periphery of the radially projecting flange so that an annular space will be provided for fluid which gets trapped between the piston and the cylinder wall.

Another object of my invention is to provide a piston which consists of a minimum of parts and which is efficient in operation.

My invention has many other objects, advantages, and features, some of which, with the foregoing, will be set forth at length in the following description where I shall outline one form of my invention, which I have selected for illustration in the drawings accompanying and forming a part of the present specification.

Figure 1:
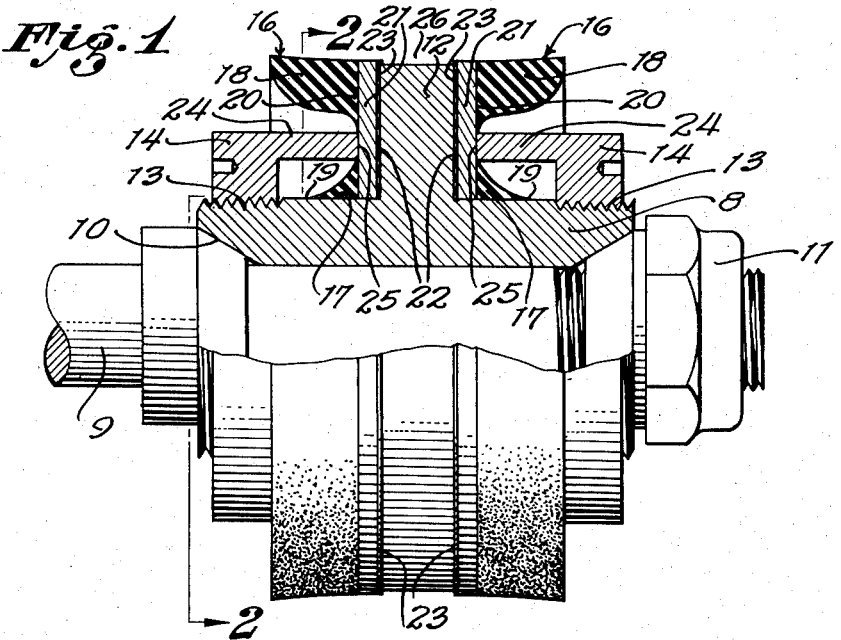
Fig. 1 is a side elevational view of a piston embodying the invention, partly in section.
Figure 2:
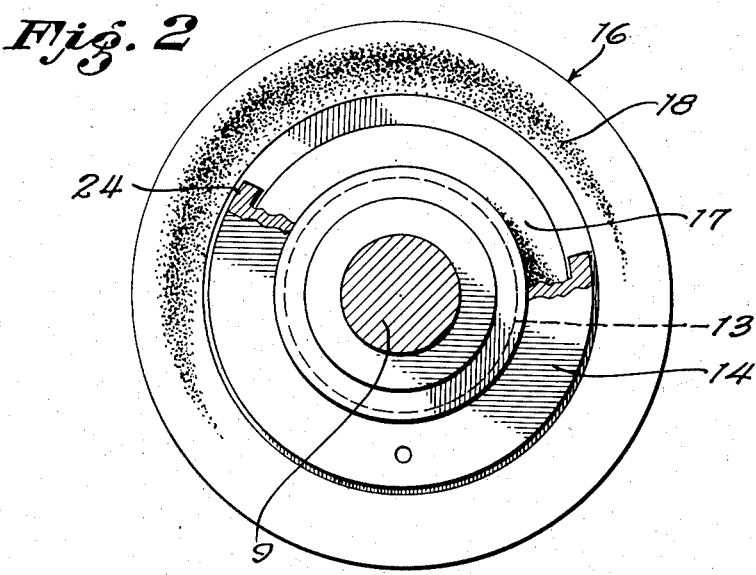
Fig. 2 is a section taken along the line 2—2 of Fig. 1.

The invention is illustrated embodied in a double acting piston, which comprises a hub 8 which is wedged on a piston rod 9 as indicated at 10 and secured on said rod by means of a retaining nut 11. A radial flange or abutment 12 projects integrally from the hub 8 intermediate the ends of the hub, which ends are threaded as indicated at 13, and provided with retaining nuts 14.

Mounted on the hub 8 on each side of the flange 12 are packing elements 16 comprising inner 17 and outer 18 portions which are formed of rubber or other suitable resilient material which parts of resilient material are referred to herein and in the claims as the resilient portions of the packing elements. The flange 12 forms a longitudinal backing for each of the packing elements 16. The end portions 19 of the inner portions 17 are adapted to be expanded by fluid pressure to seal off the packing elements 16 with respect to said hub.

Means are provided to seal off the packing elements 16 with respect to the radial flange 12 without distorting the resilient portions of the packing elements. As an instance of this arrangement, the inner end 20 of each packing element 16 is reinforced with a metallic plate 21. Resilient material, fabric, or other suitable material 22 is also provided on the inner ends 23 of said metallic plates 21, which material may be vulcanized or otherwise secured to the metallic plates 21 at the same time that the resilient material is vulcanized to said plates. The retaining nuts 14 are provided with annular longitudinally projecting flanges 24, the inner ends 25 of which are adapted to contact the metallic plates 21 between the inner 17 and outer 18 resilient portions of the packing elements 16 and seal off said packing elements 16 and said flange 12, without distorting the resilient portions 17 and 18 of said packing elements.

An annular space 26 may be provided between the packing elements 16 and beyond the periphery of the radial flange 12, so that an annular space will be provided for fluid which gets between the outer periphery of the packing elements 16 and the cylinder wall (not shown).

By means of my invention, all movement between the component parts of the assembled piston is prevented, and the packing elements are reinforced both radially and longitudinally.

The sealing off of the packing elements 16 with respect to the flange 12 without distorting the resilient portions of the packing elements 16 is an important advantage in that if the rubber is distorted as the packing element is sealed off with respect to the flange, the periphery of the rubber is forced in contact with the walls of the pump cylinder, which results in excessive wear of the resilient material.

From the foregoing description taken in connection with the accompanying drawings, the uses, advantages, and operation of my invention will be readily understood by those skilled in the art to which the invention appertains. While I have described the form of my invention which I now consider to be the best embodiment thereof, I desire to have it understood that the form shown is merely illustrative and that the invention is not to be limited to the details disclosed herein, but is to be accorded the full scope of the appended claims.

I claim:

1. In a pump piston, a hub, the ends of said hub being threaded, a radially projecting flange medial of the length of said hub and fixed against longitudinal movement relative thereto, an annular packing element mounted on each end of the hub with said radially projecting flange forming a longitudinal backing for said packing elements, each of said packing elements having inner and outer radial portions formed of resilient material, and having a radially projecting reinforcing member, and means threaded on said hub engaging said radially projecting reinforcing member between said inner and outer radial resilient portions and adapted to seal off said radially projecting reinforcing member with respect to said radially projecting flange.

2. In a pump piston, a hub, the ends of said hub being threaded, a radially projecting flange medial of the length of said hub and fixed against longitudinal movement relative thereto, an annular packing element mounted on each end of the hub with said radially projecting flange forming a longitudinal backing for said packing elements, each of said packing elements having inner and outer radial portions formed of resilient material, and having a radially projecting reinforcing member, said inner radial resilient portion being adapted to be expanded by fluid pressure to seal off said inner resilient portion with respect to said hub, and means threaded on said hub, and means threaded on said hub engaging said radially projecting reinforcing member between said inner and outer radial resilient portions and adapted to seal off said radially projecting reinforcing member with respect to said radially projecting flange.

3. In a pump piston, a hub having a pair of threaded ends, a radially projecting flange intermediate the ends of said hub and fixed against axial movement relative thereto, a pair of annular packing elements mounted about the hub at opposite sides of said radially projecting flange, each of said packing elements including a resilient portion and a radially projecting reenforcing member, and a pair of retaining nuts threaded onto the opposite ends of the hub for clamping the reinforcing members to said flange, no part of the resilient portions of the packing elements being clamped between said nuts and the flange to thus avoid substantial distortion of resilient portions.

4. In a pump piston, a hub having a pair of threaded ends, a radially projecting flange intermediate the ends of said hub and fixed against axial movement relative thereto, a pair of annular packing elements mounted about the hub at opposite sides of said radially projecting flange, each of said packing elements including a resilient portion and a radially projecting reenforcing member between said resilient portion and the flange, and a pair of retaining nuts threaded onto the opposite ends of the hub for clamping the reinforcing members to said flange, each of said nuts having an annular clamping flange extending axially inwardly past said resilient portion of the packing element and engaging the radially extending reinforcing member thereof, no part of the resilient portions of the packing elements being clamped between said nuts and the flange to thus avoid substantial distortion of said resilient portions.

JOHN W. MacCLATCHIE.

REFERENCES CITED

The following references are of record in the file of this patent:

UNITED STATES PATENTS

| Number | Name | Date |
|---|---|---|
| 1,796,415 | Tyler | Mar. 17, 1931 |
| 1,955,157 | Wayne | Apr. 17, 1934 |
| 2,285,863 | Jeffrey et al. | June 9, 1942 |
| 2,306,800 | Caldwell | Dec. 29, 1942 |